United States Patent [19]
Hlavaty et al.

[11] Patent Number: 5,728,345
[45] Date of Patent: Mar. 17, 1998

[54] METHOD FOR MAKING AN ELECTRODE FOR ELECTRICAL DISCHARGE MACHINING BY USE OF A STEREOLITHOGRAPHY MODEL

[75] Inventors: David Gerard Hlavaty, Northville; Mansour Ashtiani-Zarandi, Birmingham, both of Mich.

[73] Assignee: General Motors Corporation, Detroit, Mich.

[21] Appl. No.: 399,352

[22] Filed: Mar. 3, 1995

[51] Int. Cl.⁶ .................... B29C 33/40; B29C 35/08; B29C 41/02
[52] U.S. Cl. .................... 264/401; 264/105; 264/129; 264/221; 427/61
[58] Field of Search .................... 264/105, 129, 264/221, 401; 427/61

[56] References Cited

U.S. PATENT DOCUMENTS

| | | |
|---|---|---|
| 3,600,981 | 8/1971 | Wagner .................... 427/61 X |
| 4,575,330 | 3/1986 | Hull .................... 425/174.4 |
| 4,844,144 | 7/1989 | Murphy et al. .................... 264/401 X |
| 5,256,340 | 10/1993 | Allison et al. .................... 264/401 |

FOREIGN PATENT DOCUMENTS

| | | |
|---|---|---|
| 58-4313 | 1/1983 | Japan .................... 264/401 |
| 58004314 | 1/1983 | Japan . |
| 1 330 519 | 9/1973 | United Kingdom . |
| 90/01727 | 2/1990 | WIPO . |
| 590 957 | 10/1992 | WIPO . |

OTHER PUBLICATIONS

Abstract of Japan 5-24,118 (Published Feb. 2, 1993).
Abstract of Japan 6-297,251 (Published Oct. 25, 1994).
*Creating Complex Precision Metal Parts Using QuickCast*, Paul Blake & Owen Baumgardner, Texas Instruments; Laura Haburay & Paul Jacobs, 3D Systems, Apr. 1994.
Tanslation of Japan 58-4,313 (Published Jan. 11, 1983).

*Primary Examiner*—Leo B. Tentoni
*Attorney, Agent, or Firm*—Charles E. Leahy

[57] ABSTRACT

The present invention provides an improved method for rapidly making an electrode for electrical discharge machining. According to the invention, a stereolithography process is used to make a cured resin model of the electrode and having a network of interconnected supporting members defining the shape of the electrode and leaving channels between the supporting members to drain away uncured resin from the model. After the model is fully cured and the uncured resin drained away, a slurry mixture of graphite and resin is infiltrated into the voids of the model. The resin is then heat cured so that the resin is burned away leaving the electrode of pure carbon. Alternatively, the graphite and resin mixture can be cured sufficiently to harden and then an electrically conductive metalized coating is applied on the outer surface.

7 Claims, 4 Drawing Sheets

METHOD FOR MAKING AN ELECTRODE FOR ELECTRICAL DISCHARGE MACHINING BY USE OF A STEREOLITHOGRAPHY MODEL

The invention relates to a method by which a stereolithographic resin model can be employed to rapidly make an electrode for electrical discharge machining.

BACKGROUND OF THE INVENTION

It is well known to produce three-dimensional objects, such as prototype parts, by use of the process known as stereolithography. In stereolithography an elevator is suspended in a vat of liquid resin. A laser beam is manipulated by computer control to cure the resin. The laser beam is traversed across bath and the elevator is successively lowered into the bath to provide step-wise laminar build up of the shape of the desired prototype part. When the desired three-dimensional shape has been formed, the prototype part is raised out of the bath by the elevator.

This stereolithography process is well known and is widely used for making plastic models of component parts for the automotive, aircraft and electronics industries.

The prior art has also recognized that a stereolithographically produced resin plastic model can be used to produce a component by investment casting. In this process, the resin model becomes the pattern for the investment processing. Wax gates and vents are attached onto the resin model to form the investment pattern. The pattern is then dipped in a ceramic slurry and cured. An autoclave or other high temperature apparatus is then used to melt away the wax and burn away the resin model. The ceramic mold then can be filled with molten metal such as aluminum to make a high strength functional component part.

Electrical discharge machining is a machining process in which a workpiece is placed in a bath of dielectric fluid, and then an electrode is plunged into the workpiece. The electrode and workpiece are oppositely charged so that the shape of the electrode becomes burned into the workpiece. The electrodes are eventually consumed during the electrical discharge machining process. It is desirable in the electrical discharge machining industry to have a rapid and cost effective process for making the electrodes.

It will be understood that the stereolithography process can be used to make electrodes for electrical discharge machining. In particular, a stereolithography process can be used to make a resin model of the electrode. The resin model then becomes a pattern for making an investment casting mold. Copper, graphite or other suitable electrode material can then be cast in the investment cast mold.

It would be desirable to further improve the process for making electrodes by eliminating the need to investment cast electrodes from the resin model.

SUMMARY OF THE INVENTION

The present invention provides an improved method for rapidly making an electrode for electrical discharge machining. According to the invention, a stereolithography process is used to make a cured resin model of the electrode and having a network of interconnected supporting members defining the shape of the electrode and leaving voids between the supporting members to drain away uncured resin from the model. After the model is fully cured and the uncured resin drained away, a slurry mixture of graphite and resin is infiltrated into the voids of the model and cured, leaving an electrode which is mostly carbon but has the resin model embedded therein. If desired, the resin is burned away leaving the electrode of pure carbon. The channels remaining where the resin model burned away may be filled with graphite and resin to further densify the electrode. Alternatively, the graphite and resin mixture can be cured sufficiently to harden and then an electrically conductive metalized coating is applied on the outer surface.

DESCRIPTION OF THE PREFERRED EMBODIMENT

Figure 1:
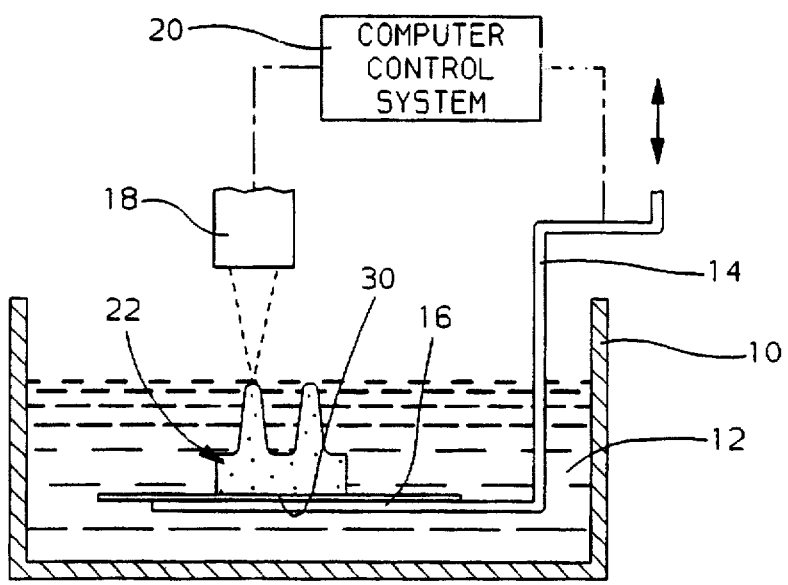
FIG. 1 is a schematic view showing the prior art apparatus for producing a three dimensional object by stereolithography.

Referring to FIG. 1, there is shown a conventional apparatus for making stereolithography resin models. The apparatus includes a vat 10 filled with a suitable liquid plastic resin 12. An elevator 14 carries a platform 16 which can be raised and lowered in the resin vat 10. A laser 18 is suspended above the vat 10 by a suitable mounting device which transverses the laser beam back and forth across the vat 10. A computer control system 20 contains the desired end shape of the resin model 22 of an electrode for electrical discharge machining. The computer control system 20 controls both laser beam and the elevator 14. The elevator 14 starts out at the surface of the resin and is progressively lowered as the laser beam traverses back and forth curing small layers of resin to provide step-wise laminar build-up of the shape of the desired electrode. When the final shape has been formed, as shown in FIG. 1, the elevator 14 is lifted to raise the resin model 22 above the level of the vat.

Figure 2:
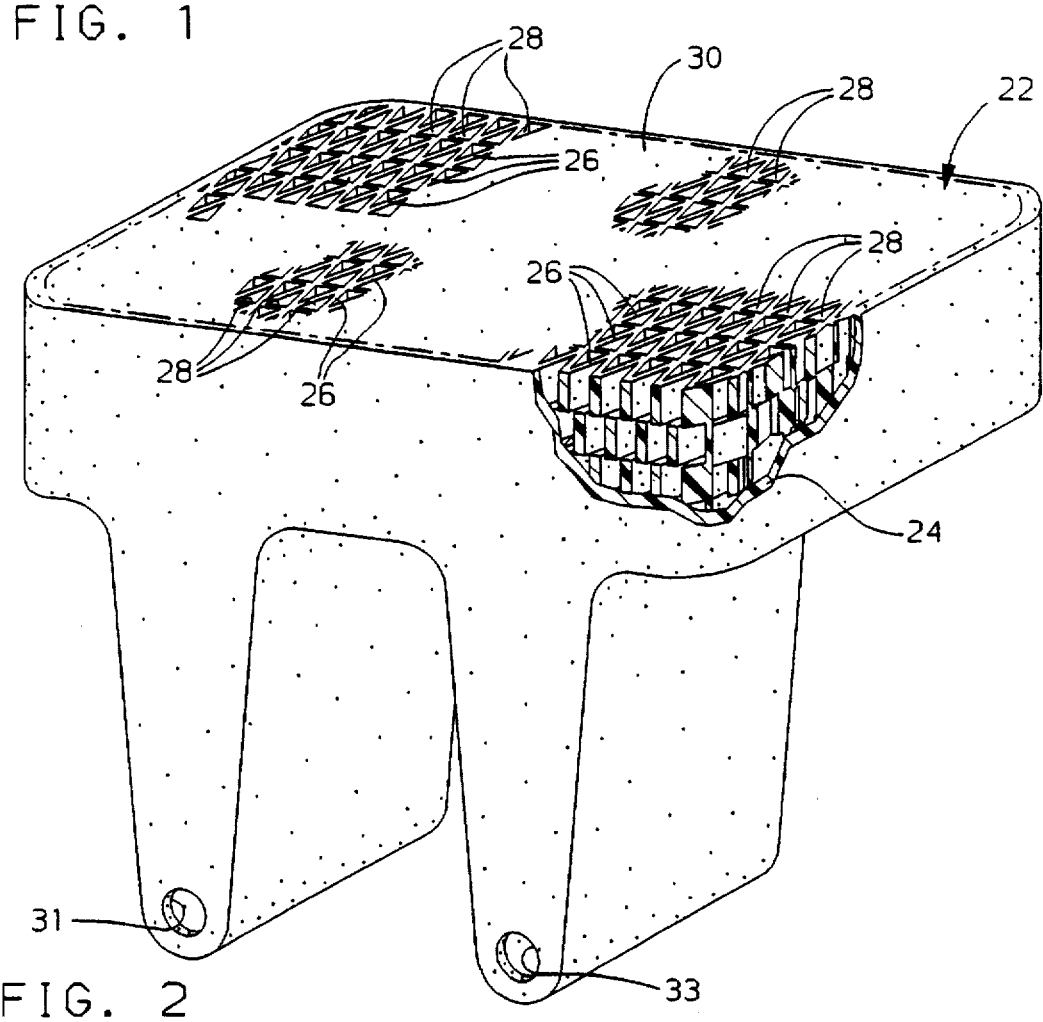
FIG. 2 is a perspective view of a resin model of an electrode which has been produced in the apparatus of FIG. 1 and is broken away to show the internal structure of the resin model including walls, thin supports, drain voids and vents.

In conventional stereolithography, the electrode model 22 is a solid resin model. However, recent developments in the field of stereolithography have introduced the idea of an improved model which can be more rapidly constructed by forming the electrode model 22 comprised of a smooth and continuous outer wall 24, as shown in FIG. 2, supported by a network of thin supporting walls 26 which overlie and intersect one another to provide a rigid egg crate type structure for support of the outer wall 24. The thin supports 26 define therebetween a network of interconnected voids 28. This structure is more rapid to form because less of the resin material needs to be cured.

As seen in FIG. 2, the upper surface 30 of the electrode model 22 has been formed without an outer skin so that the voids 28 between the thin supports wall 26 remain open and unobstructed.

Referring again to FIG. 1, it is seen that the open face 30 of the electrode model 22 faces downwardly during the stereolithography process. In this way, as soon as the elevator 14 is raised out of the vat 10, the uncured resin can readily drain out of the electrode model 22, leaving behind the cured portions which define the outer wall 24 and the support members 26. In order to further promote the draining, vent holes 31 and 33 may be provided at a suitable location in the electrode model 22, preferably at a spacing which is furthest away from the open end of the voids 28 at the open face 30.

Figure 3:
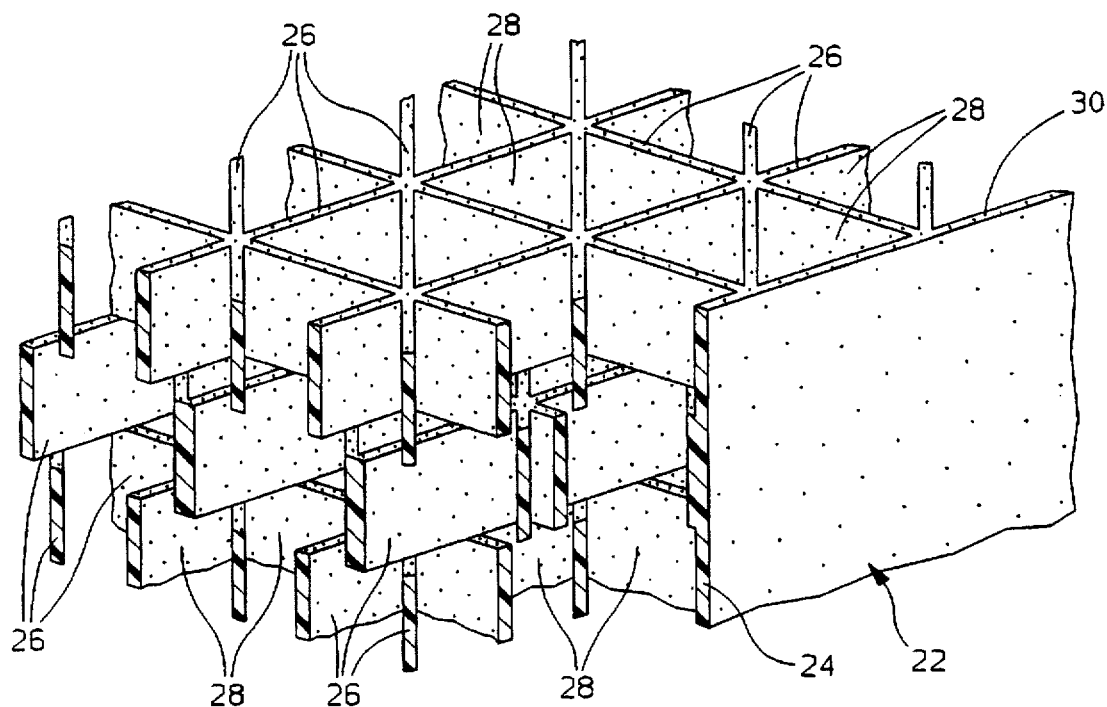
FIG. 3 is an enlarged fragmentary view of the resin model of FIG. 2.
Figure 7A:
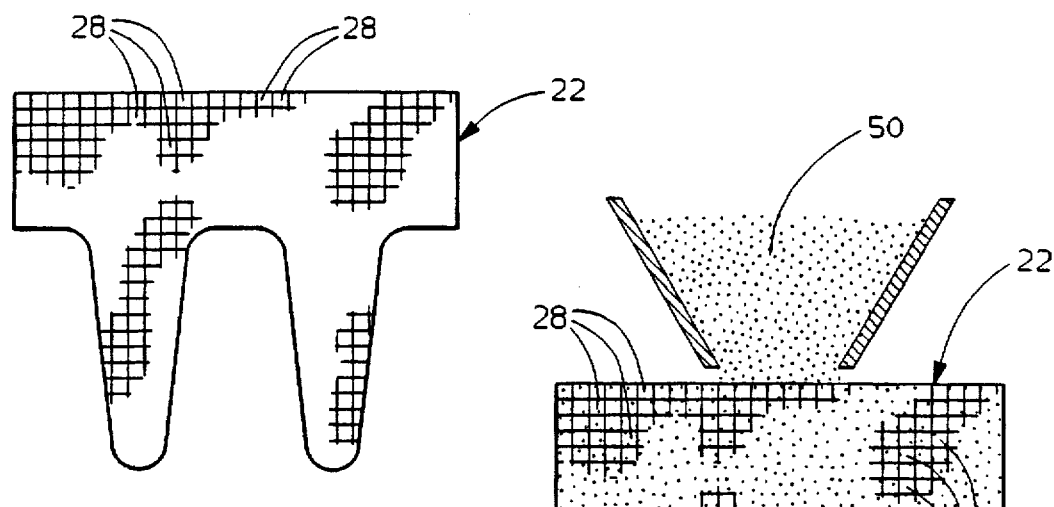
FIGS. 7A, 7B, 7C, 7D and 7E show schematic representations of the process steps involved in using the invention to make a structural prototype part.

FIG. 3 is an enlarged fragmentary view of FIG. 2, showing the outer wall 24 and the upper face 30, thin supports 26, and voids 28. In FIG. 3 it is seen that the thin supports 26 are arranged triangularly and stacked in offset layers so that the voids 28 communicate with one another throughout the resin model 22. Thus, the interconnecting communication between the voids 28 will promote and assure the thorough draining of the uncured resin from the electrode model 22. This model 22 is shown schematically in FIG. 7A.

Figure 4:
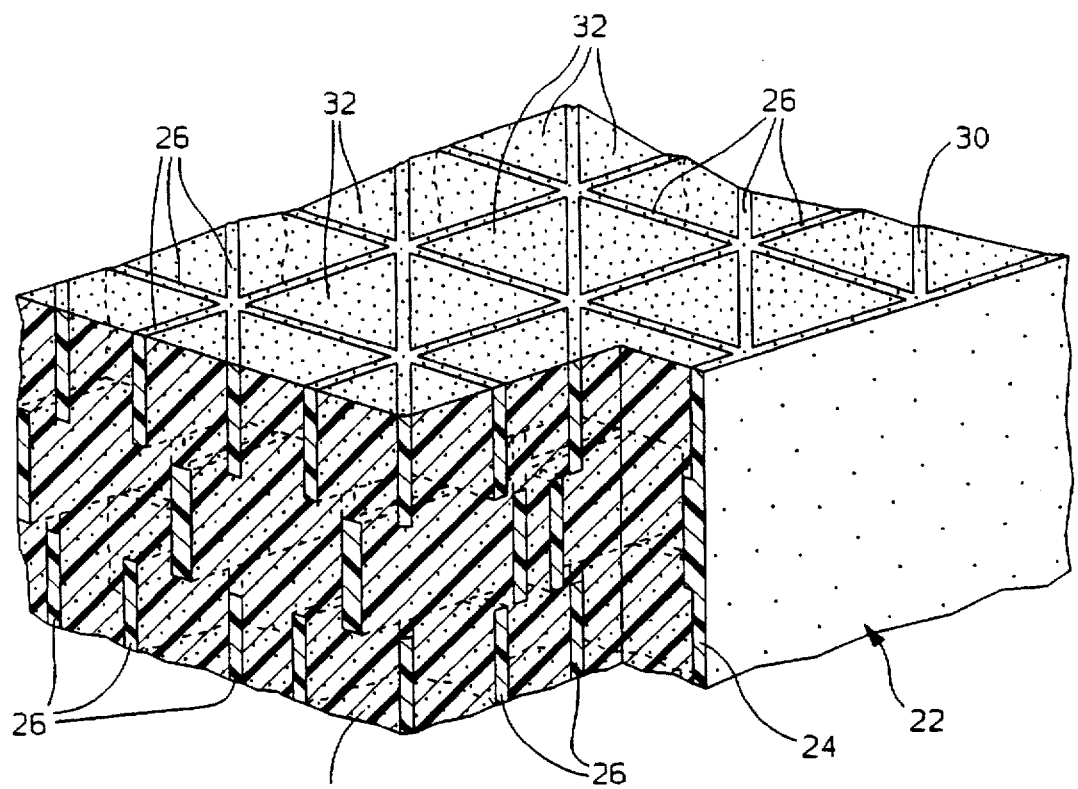
FIG. 4 is a view similar to FIG. 3, but showing the channels having been filled with graphite and resin.
Figure 7B:
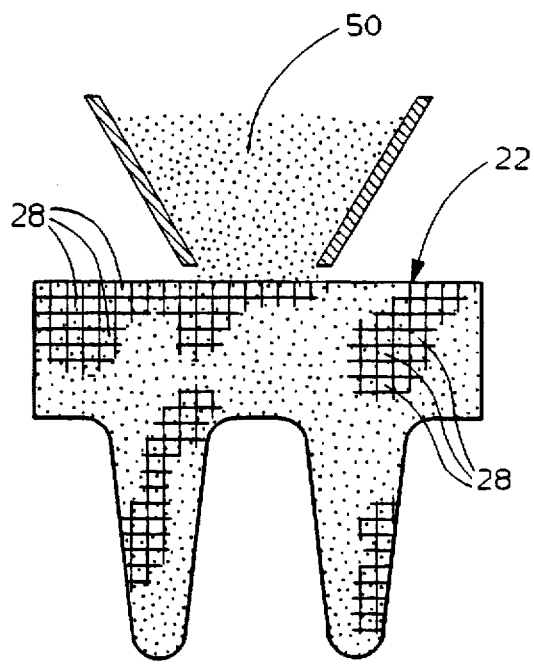
Figure 7C:
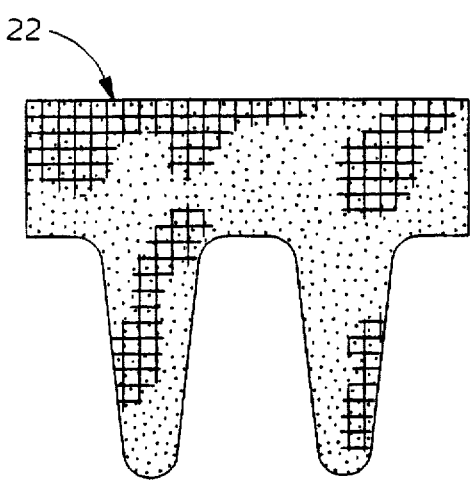

FIG. 4 shows the resin model 22 having been filled with a suitable hardenable material 32 such as a mixture of powdered graphite and resin. As seen in FIG. 4, this hardenable material 32 flows into each of the voids 28 and, when cured, provides a high strength, interconnecting structure which substantially increases the strength of the resin model 22. This filling of the model is shown schematically in FIGS. 7A, 7B and 7C. The graphite is electrically conducive so that the resin model can serve as an electrode.

Figure 5:
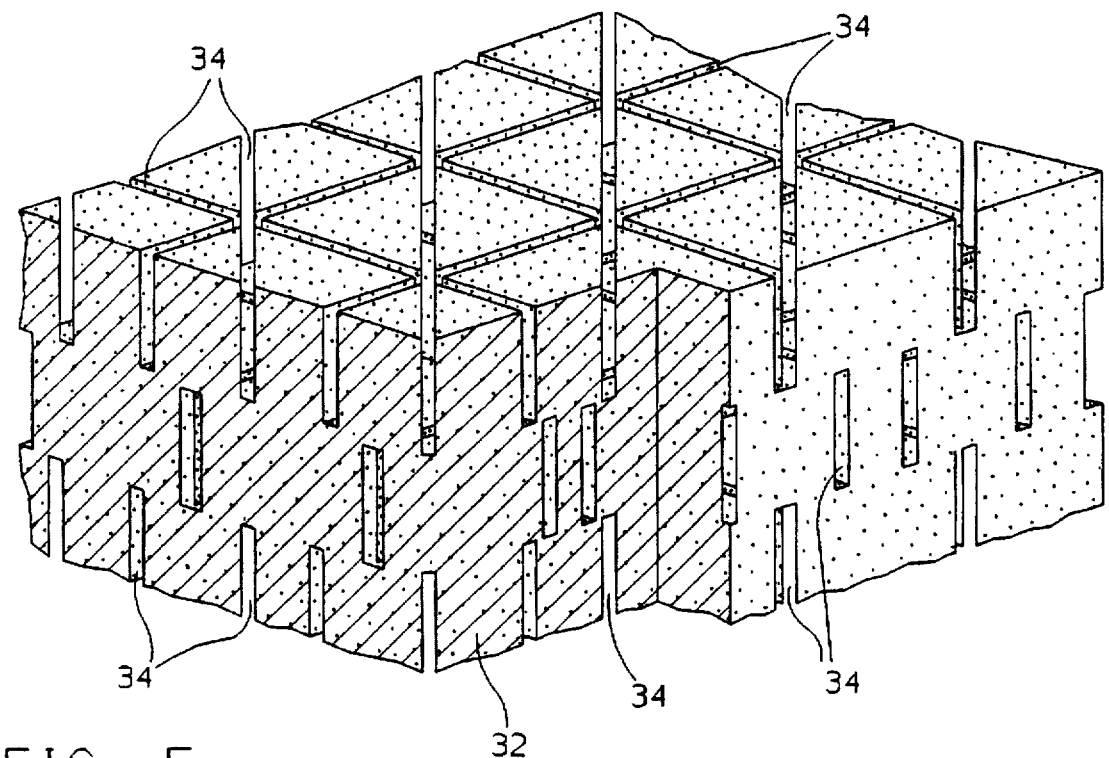
FIG. 5 shows the model of FIG. 4 with the resin portion thereof having been burned away to leave the carbon electrode having channels therein where the resin had been.

FIG. 5 shows the electrode model 22 having been heated in a furnace at a temperature which melts or burns away the resin material of the resin model 22. Accordingly, both the outer wall 24 and the thin supports 26 are burned away, leaving the graphite resin hardenable material 32 in place with only relatively thin channels 34 remaining in those locations evacuated by the burning away of the resin supports 26. The model is preferably heated in an oven having an argon gas environment so that the burning of the resin leaves a pure carbon electrode ready for use in electrical discharge machining. Because the outer wall 24 is burned away, it may be necessary to make the resin model 22 oversized by an extent equal to the thickness of the outer wall.

It will be understood that the outer surface of the resin has burned away to leave the channels where the resin has been removed so that the outer surface is not smooth because it is interrupted by the channels 34. However, this outer surface roughness and the presence of the open channels does not detract from the performance of the electrode other than shortening its useful life.

Figure 6:
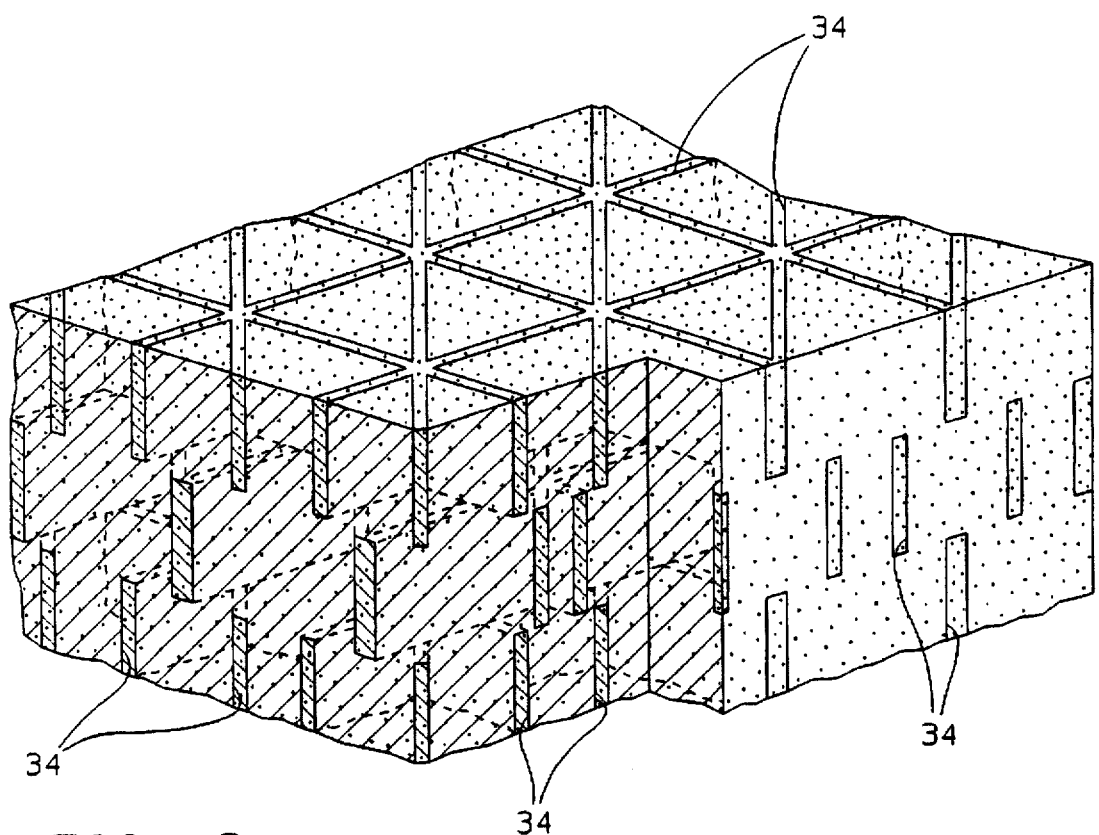
FIG. 6 is similar to FIG. 5, but shows the channels of FIG. 5 having been filled in with a graphite and resin material.

Referring to FIG. 6, it will be understood that the electrode model 22 can then be further reinforced and densified by backfilling the channels 34 with the graphite and resin mixture, which is then cured.

A suitable graphite material for use in connection with this process is known as EDM-2, sold by Poco Graphites, Inc., a Unocal Company, Decatur, Tex. A suitable resin for binding the graphite is TDT 177-114 Epoxy Binder, sold by Ciba Geigy Corporation, Formulated Systems Group, East Lansing, Mich. This resin is hardened by Ciba Geigy Hardeners RP 3209-2 and RR 3209-1 mixed in a 2.2:1 ratio. This mixture of graphite material and epoxy resin is mixed to a pourable consistency for pouring into the voids and channels of the resin model and is curable at room temperature.

Second Embodiment of the Invention

Figure 7D:
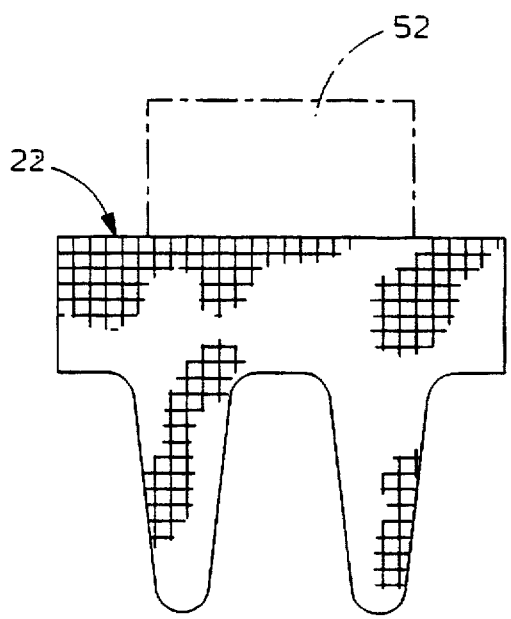

According to a second embodiment of the invention shown in FIG. 7D, an ingot of copper or other metal is placed on the resin model and heated in a furnace to diffuse the copper into the model 22. Thus, the model is electrically conductive and becomes the electrode.

Third Embodiment of the Invention

Figure 7E:
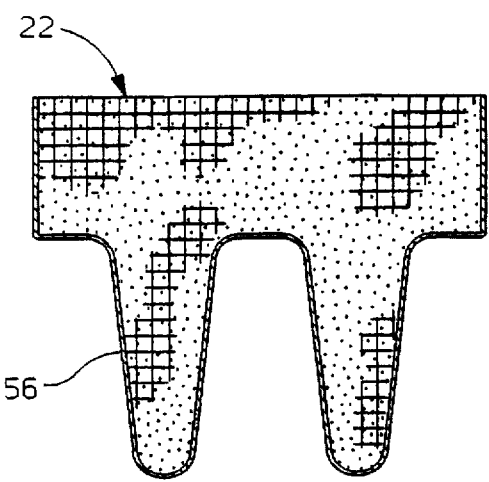

According to a third embodiment of the invention, the stereolithography process is used to make the resin model 22 and then a coating of electrically conductive metal 56 is applied to the outer surface by plating, sputtering or other deposition process. The coating may be applied to the model with or without having filled the model with graphite and resin. However, the life of the electrode is maximized by filling with graphite, burning away the model 22 and then coating with metal. The electrode, shown in FIG. 7E, is then ready for use in the electrical discharge machine.

Thus, it is seen that the invention provides a new and simplified method for making an electrode suitable for use in an electrical discharge machining operation.

What is claimed is:

1. Method of making an electrode for electrical discharge machining comprising the steps of:
   a. creating a cured resin model of the electrode having a network of interconnected supporting members defining the shape of the part and leaving voids between the supporting members to drain away uncured resin;
   b. infiltrating a mixture of carbon and resin into the voids; and
   c. curing the mixture of carbon and resin to provide an electrically conductive carbon electrode.

2. The method of claim 1 further characterized by heating to burn away the cured resin of the model so that the remaining resin bonded carbon provides an electrically conductive carbon electrode.

3. The method of claim 2 in which the burning away of the resin leaves a network of channels remaining where the cured resin was burned away, and filling the channels with resin bonded carbon to densify the electrode.

4. Method of making an electrode for electrical discharge machining comprising the steps of:
   a. creating a cured resin model of the electrode having a network of interconnected supporting members defining the shape of the part and leaving voids between the supporting members to drain away uncured resin;
   b. infiltrating a mixture of carbon and resin into the voids;
   c. curing the mixture of carbon and resin; and
   d. coating the outer surface of the model with an electrically conductive metal coating whereby an electrode is made.

5. The method of claim 4 further characterized by heating to burn away the resin model after curing the mixture of carbon and resin and before coating the outer surface with the metal coating.

6. The method of claim 5 further characterized by backfilling any channels remaining after burning away of the resin model with carbon and resin before coating the outer surface with the metal coating.

7. Method of making an electrode for electrical discharge machining comprising the steps of:
   a. creating a cured resin model of the electrode having a network of interconnected supporting members defining the shape of the part and leaving voids between the supporting members to drain away uncured resin; and
   b. diffusing an electrically conductive metal into the voids by placing an ingot on the resin model and heating to melt the ingot to flow into the voids whereby an electrode is made.

\* \* \* \* \*